UNITED STATES PATENT OFFICE.

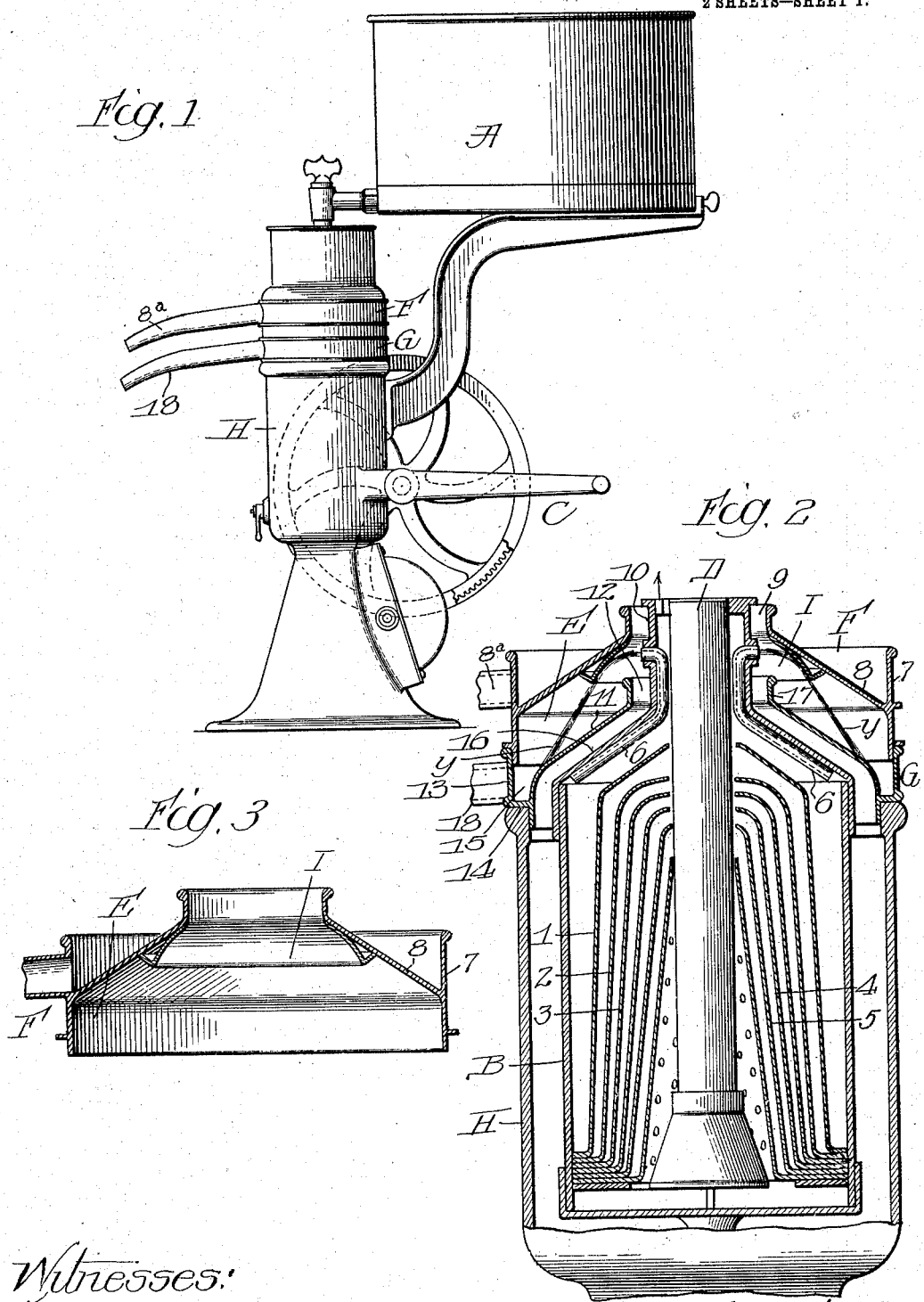

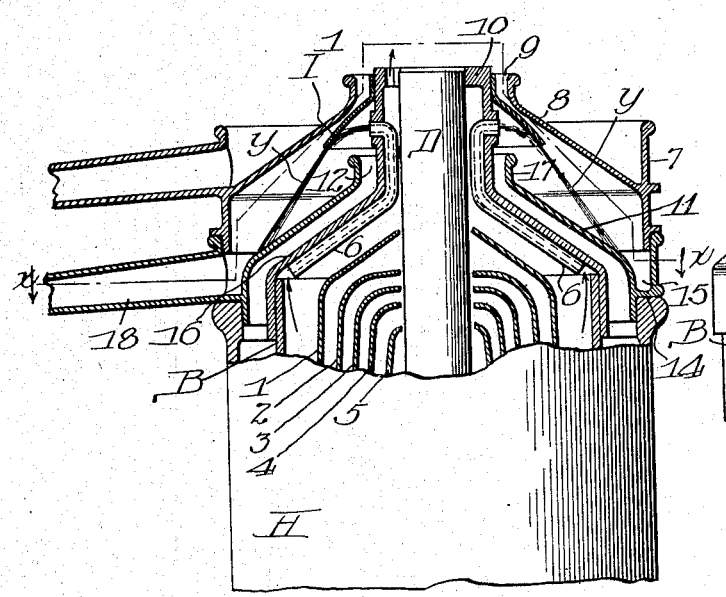
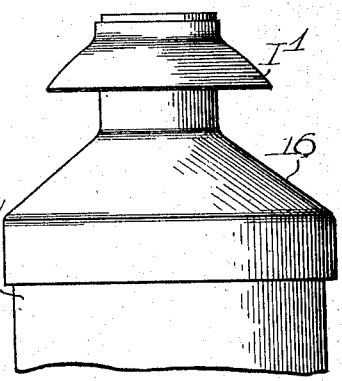
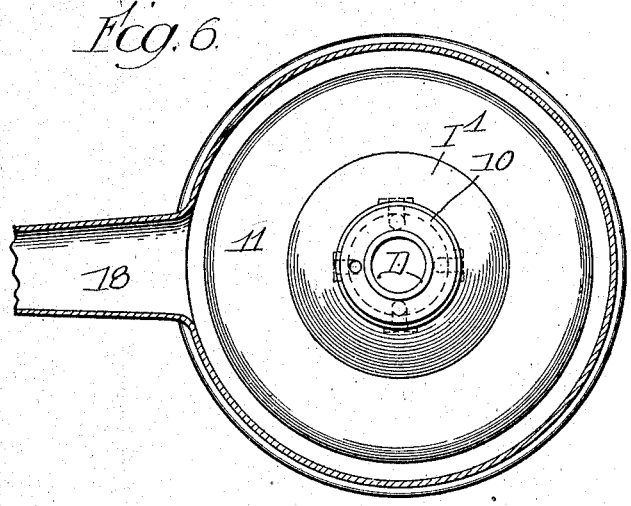
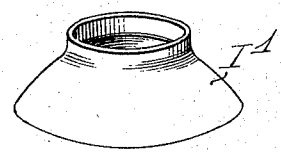

WILLIS P. SHEPHERD, OF CHICAGO, ILLINOIS.

CENTRIFUGAL SEPARATOR.

949,603.  Specification of Letters Patent. Patented Feb. 15, 1910.

Application filed February 23, 1909. Serial No. 479,490.

*To all whom it may concern:*

Be it known that I, WILLIS P. SHEPHERD, a citizen of the United States, residing at Chicago, in the county of Cook and State of Illinois, have invented certain new and useful Improvements in Centrifugal Separators, of which the following is a specification.

My invention relates to centrifugal separators of the class in which a liquid such as milk is forced through a revolving separator bowl, the heavier portion of the whole milk being thrown to the outer portion of the bowl by the resultant centrifugal force while the lighter portion (or the butter fat) is forced toward the center of the bowl.

In centrifugal separators of the class referred to, it is common to arrange for the upward flow of the skim milk and to discharge it laterally from the upper portion of the bowl, the discharge from the revolving bowl being made into an annular stationary chamber having a suitable outlet pipe or nozzle for draining the chamber. This chamber is commonly arranged around the upper portion of the bowl and is open opposite the latter so as to permit the ejection of the skim milk from the revolving bowl by way of discharge ports or tube ends with which the bowl is provided.

Prior to my invention an objectionable feature incident to the foregoing described arrangement and operation has consisted in the tendency of the skim milk, which is ejected with considerable force into the said chamber, to foam up proportional to the extent of its temporary accumulation in the chamber and to back up toward the bowl to an extent to permit it to find its way into such space as is necessary between the revolving bowl and stationary collecting chamber, and to leak down the side of the bowl, thereby causing what is commonly termed a "leaky bowl." This leakage down between the bowl and surrounding chamber has proved in use an objectionable matter and a thing of considerable annoyance to users who of course desire externally dry and clean conditions, and who object to the slopping about of skim milk, particularly where stringent sanitary rules are to be observed.

The object of my invention is to prevent said undesirable leakage of skim milk and to provide simple and practical means for overcoming such objectionable leakage as hereinafter set forth.

In the accompanying drawings: Figure 1 is an elevation of a well known form of a centrifugal separator. Fig. 2 is a section on a vertical plane taken centrally through the rotary separator bowl, the cream and skim milk covers, and a portion of the outer shell or casing within which the rotary separator bowl is arranged, this view being on a larger scale than the scale of the preceding figure. Fig. 3 is a vertical central section through the part or member commonly termed the cream cover. Figs. 3 and 2 each show means for directing the discharge of skim milk from the bowl in accordance with my invention. Fig. 4 is a section corresponding with the upper portion of Fig. 2, but showing a deflector on the upper portion of the bowl in place of on the inner side of the cream cover as in Fig. 2. Fig. 5 shows in elevation the upper portion of the rotary separator bowl with the deflector applied thereto. Fig. 6 is a section on line $x$ $x$ in Fig. 1. Fig. 7 is a perspective view of the deflector illustrated in Figs. 4, 5 and 6. In Figs. 2 and 4 the centrally arranged vertical supply tube is shown in elevation.

The general construction of the centrifugal separator illustrated in the drawings is of a well known type, and its action resulting in the separation of the whole milk into skim milk and cream is well understood by those skilled or familiar with the art. It is therefore considered as only necessary to state that A indicates a supply receptacle and B denotes a rotary separator bowl which is understood to be revolved in practice with great rapidity by means of suitable driving mechanism, for example, by means of suitable driving gear which can be operated by a crank handle C. In the construction of separator shown, whole milk from receptacle A passes into the upper end of tube D arranged axially within the bowl. Perforated cones 1, 2, 3, 4, 5, are arranged within the bowl, these cones being provided with upper openings for the supply tube D. The whole milk is understood to pass out through the lower end portion of the tube D and as a result of centrifugal action, skim milk passes outwardly and thence upwardly along the inner wall of the bowl, while the cream passes up along the outer side of the tube D and up along the inner sides of the cones to points where it will encounter and pass up along the outer side of said supply tube.

The upper portion of the rotary bowl is shown provided with tubes or ducts 6 which receive the rising skim milk and conduct it to points where the upper ends of the tubes 6 which constitute ports, discharge said skim milk into an annular chamber E. This annular chamber E is extended around the upper end portion of the bowl, and said chamber is stationary when the bowl revolves, the skim milk during the rotation of the bowl being thrown or ejected by centrifugal action into said chamber. As shown the chamber is formed by the conjunction of a member F commonly known as a cream pan, and a member G commonly known as a skim milk pan. The cream pan F comprises a cylindric ring 7 united to the margin of a trunco-conical diaphragm 8 having a central aperture 9 for the neck 10 of the rotary bowl.

The skim milk pan G is shown constructed with an outer annular upturned wall 13 and an inner wall portion formed by a downwardly flaring diaphragm 11 having an outer extended portion which is turned down so as to provide the chamber E with a relatively deeper portion 15, having a bottom portion 14 uniting the marginal portion of diaphragm 11 with the outer wall portion 13 of the skim milk pan. The outer chamber portion of chamber E is herein termed the skim milk collecting portion of the chamber, the higher and inner portion of said chamber being termed its receiving portion. The diaphragm 11 has a central aperture 12 for the neck portion 10 of the rotary separator bowl, the two pans being relatively constructed to provide the chamber E with an annular receiving opening opposite the discharge port or ports of the rotary bowl, said annular opening or space being between diaphragm 8 of the cream pan and the inner edge portion of diaphragm 11 and the skim milk pan which provides a neck or upturned flange 17 around the opening 12.

When the separator bowl revolves, the cream and skim milk pans remain stationary, and it is therefore desirable to provide suitable space between the skim milk pan and the upper bowl portions 10 and 16. The diaphragm or bottom portion 8 of the cream pan F inclines downwardly and outwardly so as to provide said pan with a relatively deeper marginal connecting portion, said pan being provided with a discharge spout 8$^a$ for drawing off the cream which collects during operation in such marginal collecting portion of the pan. The diaphragm 8 therefore forms a downwardly and outwardly inclined top for chamber E, and if the discharge of skim milk from the laterally ported portion of the separator bowl is allowed to impact against the underside of diaphragm 8, it will be deflected therefrom outwardly and downwardly into the skim milk in the marginal collecting portion or chamber E, whereby the foaming up of the skim milk will be augmented, and in such case, the foaming milk will soon rise and find its way into the portion or opening 12 between neck 10 of the bowl and the flange or neck portion 17 of the diaphragm 11. In order to prevent this objectionable action, I provide a deflecting device having an annular downwardly flaring deflecting face directly opposite and extending around the laterally ported portion of the separator bowl, said deflecting device being united with the diaphragm 8 as substantially a part thereof and being therefore non-revoluble. When therefore the separator bowl is revolved at high speed, the heavier portion, such as skim milk of a liquid such as whole milk fed into the bowl, will discharge from the port or ports provided for such purpose and be thrown by centrifugal action forcibly against the annular deflecting face I, which latter receives the impact of the full or entire discharge of skim milk from the laterally ported portion of the revolving separator bowl. It will therefore be seen that by providing the separator bowl with one or more suitably contracted lateral or side port openings, such port or ports will coact or coöperate with centrifugal action to throw the full discharge of skim milk outwardly and against the deflecting face I, freely and with a force proportional to the speed of rotation of the separator bowl, it being well known that in centrifugal separators of the class to which my invention relates, the separator bowl is revolved at an exceedingly high rate of speed in order to effect by centrifugal action the separation of the relatively heavy skim milk portion from the relatively light cream portion of whole milk fed into the separator bowl.

The deflecting face I presents a continuous or unbroken annular flaring surface, and this deflecting face is therefore adapted to cause the skim milk which is thus forcibly thrown against it to form and leave such deflecting face in the condition of an annular sheet of liquid which is directed downwardly from the said deflecting face and which thus passes downwardly with a velocity also proportional to the degree of force with which the skim milk is primarily thrown from the ported portion of the bowl against said deflecting face I. The deflecting face I is also arranged at an angle and in position to cause the skim milk which leaves it in an annular sheet form, as indicated by broken lines $y$, to impinge tangentially and forcibly against the wall or diaphragm 11 along a line between the inner receiving portion and the outer collecting portion of the chamber E, said line being relatively within or inside of the marginal and relatively deeper skim milk collecting portion 15 of the chamber E, as illustrated in Fig. 2. When therefore the separator is in operation, the outer portion of chamber E will be cut off or separated from its inner open receiving portion by the deflecting face I and the annular sheet Y of skim milk passing from the deflecting face to and against the diaphragm 11 which provides an inner side wall portion and also an inclined bottom portion for chamber E. With this arrangement, skim milk collecting and foaming up in the outer portion of chamber E will be prevented from passing inwardly into the inner receiving portion of chamber E, and skim milk or foam or both tending to rise along diaphragm 11 will be opposed and driven outwardly by the annular sheet Y of skim milk impinging tangentially against diaphragm 11.

Figs. 4, 5, 6 and 7, illustrate a truncoconical deflector I' detachably secured upon the bowl neck 10 and having its inner deflecting surface or face opposite the laterally ported portion of the bowl so as to directly receive the full discharge of skim milk, the annular sheet Y of skim milk being directed against diaphragm 11 as in Fig. 4.

Portions of the apparatus shown in Figs. 4, 5 and 6, are indicated by reference characters applied to corresponding parts in the first three figures of the drawings, the point of difference between the first three figures and the last four figures of the drawings, being that in said last four figures the deflector is carried by the bowl, and is therefore revoluble therewith. As a preferred arrangement however the deflector is non-revoluble as illustrated by the first three figures.

What I claim as my invention is:

1. In a centrifugal separator of the class described, the combination of a rotary separator bowl for effecting by centrifugal action the separation of whole milk into skim milk and cream, the separator bowl being provided with one or more ports adapted for discharging the skim milk from the separator bowl and coöperating with centrifugal action during rotation of the separator bowl to project such discharge outwardly and with a velocity proportional to the rotary speed of the separator bowl; a chamber extending around the separator bowl and having its inner receiving chamber portion provided with an annular inlet opening opposite the skim milk discharge port or ports of the separator bowl and an outer skim milk collecting chamber portion for collecting the skim milk admitted into the chamber by way of its opening opposite the discharge port or ports of the bowl, and having an outlet for discharging the same; a non-revoluble deflecting device having a continuous annular and downwardly flaring deflecting face arranged to receive the impact of the full discharge of skim milk thrown outwardly by centrifugal force from the bowl ports, and adapted to cause the skim milk thus thrown against it to form and leave it in the condition of an annular sheet of liquid projected downwardly with a velocity proportional to the force with which the discharge from the separator bowl primarily impacts against the deflecting face, the said chamber being constructed with a downwardly and outwardly inclined side or bottom portion between its annular inlet opening and its outer collecting portion, and the angle of the deflecting face being arranged to cause the annular sheet of skim milk directed therefrom to impinge tangentially against said side or bottom portion of the chamber along a line between the inner receiving portion and the outer collecting portion of the chamber, these two portions of the chamber being cut off the one from the other by the deflecting face and the sheet of skim milk extending between the deflecting face and the bottom portion of the chamber during operation; and means for rotating the separator bowl.

2. In a centrifugal separator of the class described, the combination of a rotary separator bowl for effecting by centrifugal action the separation of whole milk into skim milk and cream, the separator bowl being provided with one or more lateral ports adapted for discharging the skim milk from the separator bowl and coöperating with centrifugal action during rotation of the separator bowl to project such discharge outwardly and with a velocity proportional to the rotary speed of the separator bowl; a chamber extending around the separator bowl and having its inner receiving chamber portion provided with an annular inlet opening opposite the skim milk discharge port or ports of the separator bowl and an outer skim milk collecting chamber portion for collecting the skim milk admitted into the chamber by way of its opening opposite the discharge port or ports of the bowl, and having an outlet for discharging the same; a non-revoluble deflecting device having a continuous annular and downwardly flaring deflecting face arranged to receive the impact of the full discharge of skim milk thrown outwardly by centrifugal force from the bowl ports, and adapted to cause the skim milk thus thrown against it to form and leave it in the condition of an annular sheet of liquid projected downwardly with a velocity proportional to the force with which the discharge from the separator bowl primarily impacts against the deflecting face, the said chamber being constructed with a bottom portion between its annular inlet opening and its outer collecting portion, and the angle of the deflecting face being arranged to cause the annular sheet of skim milk directed therefrom to impinge tangentially against said bottom portion of the chamber along a line between the inner receiving portion and the outer collecting portion of the chamber, these two portions of the chamber being cut off the one from the other by the deflecting face and the sheet of the skim milk extending between the deflecting face and the bottom portion of the chamber during operation; and means for rotating the separator bowl.

3. In a centrifugal separator of the class described, the combination of a rotary separator bowl for effecting by centrifugal action the separation of whole milk into skim milk and cream, the separator bowl being provided with one or more lateral ports adapted for discharging the skim milk from the separator bowl and coöperating with centrifugal action during rotation of the separator bowl to project such discharge outwardly and with a velocity proportional to the rotary speed of the separator bowl; a chamber extending around the separator bowl and having its inner receiving chamber portion provided with an annular inlet opening opposite the skim milk discharge port or ports of the separator bowl and an outer skim milk collecting chamber portion for collecting the skim milk admitted into the chamber by way of its opening opposite the discharge port or ports of the bowl, and having an outlet for discharging the same; a deflecting device having a continuous annular and downwardly flaring deflecting face arranged to receive the impact of the full discharge of skim milk thrown outwardly by centrifugal force from the bowl ports, and adapted to cause the skim milk thus thrown against it to form and leave it in the condition of an annular sheet of liquid projected downwardly with a velocity proportional to the force with which the discharge from the separator bowl primarily impacts against the deflecting face, the said chamber being constructed with a downwardly and outwardly inclined side or bottom portion between its annular inlet opening and its outer collecting portion, and the angle of the deflecting face being arranged to cause the annular sheet of skim milk directed therefrom to impinge tangentially against said side or bottom portion of the chamber along a line between the inner receiving portion and the outer collecting portion of the chamber, these two portions of the chamber being cut off the one from the other by the deflecting face and the sheet of skim milk extending between the deflecting face and the bottom portion of the chamber during operation; and means for rotating the separator bowl.

4. In a centrifugal separator of the class set forth, the combination of a rotary separator bowl for effecting by centrifugal action the separation of a relatively heavier liquid portion from a relatively lighter liquid portion of a liquid such as whole milk, the separator bowl being ported for discharging the separated heavier liquid portion while the bowl is revolving and throwing the discharge outwardly with a degree of force proportional to the rotary speed of the separator bowl; a chamber extending around the separator bowl and having an inner receiving portion open opposite and around the ported bowl portion, a collecting gutter like portion having an outlet, and an inclined wall portion between said gutter like portion and its opening opposite the ported bowl portion; an annular deflector supported opposite the ported bowl portion and having its deflecting face adapted and arranged to receive the full discharge from the ported bowl portion and to direct such discharge in the condition of an annular sheet tangentially to and against the said inclined wall portion of the chamber along a line between its said gutter portion and its receiving opening; and means for rotating the separator bowl.

WILLIS P. SHEPHERD.

Witnesses:
CHARLES G. PAGE,
OTTILIE C. FREIBERG.